United States Patent
Adler et al.

(10) Patent No.: US 9,759,382 B2
(45) Date of Patent: Sep. 12, 2017

(54) METHOD FOR FILLING UP A STORAGE TANK WITH A GASEOUS PRESSURIZED MEDIUM, IN PARTICULAR HYDROGEN

(71) Applicants: Robert Adler, Gerasdorf (AT); Georg Siebert, Vienna (AT); Martin Pfandl, A-Rust im Tullnerfeld (AT); Michael Stefan, Zillingdorf (AT)

(72) Inventors: Robert Adler, Gerasdorf (AT); Georg Siebert, Vienna (AT); Martin Pfandl, A-Rust im Tullnerfeld (AT); Michael Stefan, Zillingdorf (AT)

(73) Assignee: Linde Aktiengesellschaft, Munich (DE)

( * ) Notice: Subject to any disclaimer, the term of this patent is extended or adjusted under 35 U.S.C. 154(b) by 269 days.

(21) Appl. No.: 14/772,628

(22) PCT Filed: Feb. 27, 2014

(86) PCT No.: PCT/EP2014/000521
§ 371 (c)(1),
(2) Date: Sep. 3, 2015

(87) PCT Pub. No.: WO2014/135258
PCT Pub. Date: Sep. 12, 2014

(65) Prior Publication Data
US 2016/0033080 A1    Feb. 4, 2016

(30) Foreign Application Priority Data
Mar. 8, 2013 (DE) .................. 10 2013 003 999

(51) Int. Cl.
*B65B 1/20* (2006.01)
*F17C 5/04* (2006.01)
*F17C 5/06* (2006.01)

(52) U.S. Cl.
CPC ............... *F17C 5/04* (2013.01); *F17C 5/06* (2013.01); *F17C 2201/054* (2013.01);
(Continued)

(58) Field of Classification Search
CPC ...... F17C 5/04; F17C 5/06; F17C 2225/0153; F17C 2223/0153; F17C 2223/0161;
(Continued)

(56) References Cited

U.S. PATENT DOCUMENTS

| 2004/0148945 A1* | 8/2004 | Matheoud ................ F17C 5/02 62/48.2 |
| 2007/0000016 A1* | 1/2007 | Handa .................... B60K 15/00 2/158 |

(Continued)

FOREIGN PATENT DOCUMENTS

| DE | 41 29 020 A1 | 3/1993 |
| DE | 296 23 750 U1 | 9/1999 |

(Continued)

*Primary Examiner* — Jason K Niesz
(74) *Attorney, Agent, or Firm* — Philip H. Von Neida

(57) ABSTRACT

A method for filling up a storage tank (e.g., a vehicle tank) with a gaseous, pressurized medium, in particular in the form of hydrogen, in which a supply tank system for storing the hydrogen is connected with the storage tank to be filled by way of a tank feed line and a fueling valve, wherein, prior to filling up the storage tank with aforesaid medium with the fueling valve closed, a flow of the medium for cooling the tank feed line is guided through the tank feed line at a predefinable target temperature, and removed from the tank feed line through a line that branches away upstream from the fueling valve. The disclosure further provides for a fueling facility for filling up a storage tank.

15 Claims, 1 Drawing Sheet

(52) U.S. Cl.
CPC .. *F17C 2201/056* (2013.01); *F17C 2201/058* (2013.01); *F17C 2203/0366* (2013.01); *F17C 2205/0364* (2013.01); *F17C 2221/012* (2013.01); *F17C 2223/0123* (2013.01); *F17C 2223/0153* (2013.01); *F17C 2223/0161* (2013.01); *F17C 2223/036* (2013.01); *F17C 2225/0123* (2013.01); *F17C 2225/0153* (2013.01); *F17C 2225/036* (2013.01); *F17C 2227/039* (2013.01); *F17C 2227/0337* (2013.01); *F17C 2227/0341* (2013.01); *F17C 2260/023* (2013.01); *F17C 2260/025* (2013.01); *F17C 2265/065* (2013.01); *F17C 2270/0168* (2013.01); *F17C 2270/0184* (2013.01); *Y02E 60/321* (2013.01)

(58) Field of Classification Search
CPC ........ F17C 2270/0168; F17C 2260/025; F17C 2260/023; F17C 2227/039; F17C 2227/0341; F17C 2227/0337; F17C 2225/036; F17C 2223/036; F17C 2265/065; F17C 2223/0123; F17C 2221/012; F17C 2205/0364; F17C 2203/0366; F17C 2201/058; F17C 2201/056; F17C 2201/054; F17C 2270/0184; F17C 2225/0123
See application file for complete search history.

(56) References Cited

U.S. PATENT DOCUMENTS

| | | | |
|---|---|---|---|
| 2008/0078188 A1* | 4/2008 | Matheoud | F17C 5/02 62/50.1 |
| 2010/0108190 A1* | 5/2010 | Baumer | F17C 5/007 141/197 |
| 2015/0153005 A1* | 6/2015 | Takano | F17C 5/06 141/4 |
| 2016/0033080 A1* | 2/2016 | Adler | F17C 5/04 141/5 |
| 2016/0265478 A1* | 9/2016 | Oversby | F17C 7/02 |

FOREIGN PATENT DOCUMENTS

| | | |
|---|---|---|
| DE | 10 2006 019993 B3 | 12/2007 |
| DE | 102007 011530 A1 | 9/2008 |
| DE | 10 2009 037108 A1 | 2/2011 |
| EP | 1 770 326 A2 | 4/2007 |
| EP | 2 128 514 A1 | 1/2011 |
| WO | WO 02/086379 A1 | 10/2002 |

\* cited by examiner

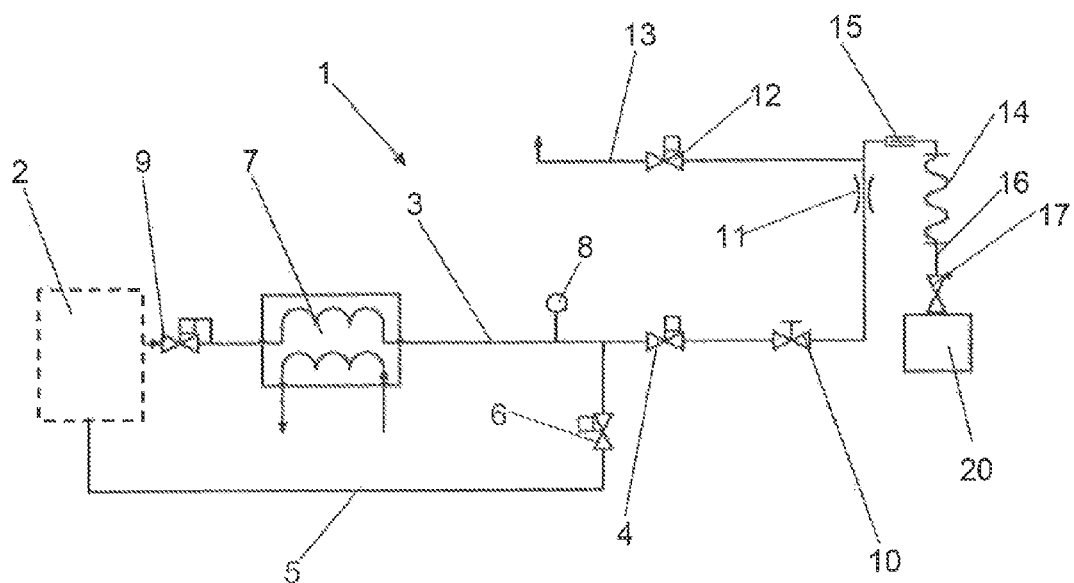

METHOD FOR FILLING UP A STORAGE TANK WITH A GASEOUS PRESSURIZED MEDIUM, IN PARTICULAR HYDROGEN

CROSS-REFERENCE TO RELATED APPLICATIONS

This application claims priority under 35 USC §119 to International Patent Application No. PCT/EP2014/000521 filed in the European Patent Office on Feb. 27, 2014, which claims priority from German Patent Application 102013003999.1 filed on Mar. 8, 2013.

BACKGROUND OF THE INVENTION

The invention relates to a method for filling up a storage tank with a gaseous, pressurized medium, in particular hydrogen, as well as to a fueling facility for filling up a storage tank with such a medium.

Vehicles that take gaseous hydrogen as a fuel require specially designed fueling facilities, which guide the hydrogen into the storage tank of the vehicle, which in this case is also referred to as a vehicle tank. Such a fueling facility or gas station usually exhibits a tank with liquid hydrogen or is hooked up directly to a hydrogen pipeline or other systems that can provide hydrogen. Since the hydrogen for fueling is to be present in the gaseous phase, such a fueling facility usually has a gas buffer tank, which is supplied by the aforementioned (liquid hydrogen) tank and holds the gaseous hydrogen available.

Standard SAE J2601 was created to ensure safety (explosion risk) for the environment when filling up hydrogen tanks (e.g., vehicle tanks) with hydrogen and provide a standard for the fueling process. Among other things, the standard places safety-related limits and performance requirements on the fueling process. SAE J2601 provides that hydrogen-powered vehicles can be refueled within three minutes, without the temperature of the hydrogen rising to above a temperature of 85° C. in the process. At the same time, it requires that the temperature of the hydrogen not exceed −40° C. while fueling as it enters the storage tank. There are also rules that govern permitted temperature fluctuations while fueling.

In order not to exceed the maximum permissible temperature of 85° C. while fueling or drop below the limited precooling of the hydrogen to −40° C., the temperature of the hydrogen for filling up a storage tank must thus among other things be brought to a comparatively narrow temperature range of −33 to −40° C., preferably within 25 s.

Given the changing temperature conditions in the pipelines, it is comparatively complicated and cost-intensive to realize a constant temperature for the hydrogen (e.g., of −40°) at the gas pump. Among other things, this is because the tank feed line temperature comes to approximate the ambient temperature once a fueling process has ended. An excessively heated tank feed line can thus keep the hydrogen at the gas pump from reaching the prescribed temperature range of −33 to −40° C. within a set period of time, so that the fueling process must be interrupted.

In order to prevent this, long tank feed lines require that the tank feed line be cooled, or a cooling device that is positioned as close as possible to the fueling nozzle to the storage tank. However, cooling the tank feed line is associated with high costs, and a cooling device on the fueling nozzle must be provided with all the cooling capacity required, which in turn makes the cooling device and connecting lines significantly more expensive.

Proceeding from the above, the object of the present invention is to provide a method of the type mentioned above, in which the tank line can be quickly and comparatively inexpensively cooled in such a way that the hydrogen exhibits the target temperature while being introduced into the storage tank or vehicle tank.

SUMMARY OF THE INVENTION

This object is achieved by a method for filling up a storage tank, in particular in the form of a vehicle tank, with a gaseous, pressurized medium, in particular in the form of hydrogen, in which a supply tank system for storing the hydrogen is connected with the storage tank to be filled by way of a tank feed line, wherein, prior to filling up the storage tank with aforesaid medium, a flow of the medium for cooling the tank feed line is guided through the tank feed line, and removed from the tank feed line through a line that branches away from the tank feed line upstream from the storage tank.

The latter provides that a supply tank system for storing the hydrogen be connected with the storage tank to be filled by way of a tank feed line, and in particular a fueling valve (e.g., inlet valve of a gas pump), wherein, prior to filling up the storage tank with aforesaid medium, in particular with the fueling valve closed, a flow of the medium for cooling the tank feed line is guided through the tank feed line at a predefinable target temperature, and removed from the tank feed line through a line that branches away in particular upstream from the fueling valve.

In particular, the aforesaid storage tank involves a vehicle tank of a vehicle for storing gaseous hydrogen, which serves in particular as a fuel for powering the vehicle.

The supply tank system further preferably involves a system for storing and relaying the medium, which can exhibit various components, in particular an underground storage tank as well as a gas buffer tank connected thereto.

In an especially preferred embodiment, the line is further designed as a return line, wherein the medium used for cooling the tank feed line is returned to the supply tank system by way of this line.

The actual temperature of the tank feed line is preferably measured while cooling the tank feed line upstream from the branch of aforesaid line.

In another preferred embodiment, the storage tank is filled with the medium when the actual temperature is less than or equal to the desired target temperature.

In order to fill up the storage tank, the fueling valve is preferably opened, and the aforesaid line is blocked by means of a valve provided downstream from the branching point of the line. The valves preferably involve pneumatic valves.

The problem according to the invention is further resolved with a fueling facility for filling up a storage tank, in particular in the form of a vehicle tank, with a gaseous pressurized medium, in particular in the form of hydrogen, with a gaseous, pressurized medium, in particular in the form of hydrogen, with:

a supply tank system for storing the medium, and
a tank feed line set up and provided to connect the supply tank system with the storage tank, characterized in that the fueling facility is designed to guide a flow of medium for cooling the tank feed line through the tank feed line prior to filling up the storage tank, and remove it from the tank feed line by way of a line of the fueling facility that branches away from the tank feed line.

The latter provides that the fueling facility exhibit a supply tank system for storing the medium, a tank feed line that connects the supply tank system with the storage tank, in particular by way of a fueling valve (e.g., inlet valve of a gas pump), as well as a line that branches away from the tank feed line in particular upstream from the fueling valve, wherein the fueling facility is designed to guide a flow of medium for cooling the tank feed line through the tank feed line prior to filling up the storage tank, and remove it from the tank feed line by way of a line of the fueling facility that branches away from the tank feed line in particular upstream from the fueling valve.

The line is preferably designed as a return line configured to return the medium used to cool the tank feed line into the supply tank system.

In another preferred embodiment, the line exhibits a valve for blocking the line while filling up the storage tank with the medium. The valve preferably involves a pneumatic valve.

Preferably situated between the supply tank system and branch of aforesaid line is a cooling device, which is set up and provided to cool the medium. The cooling device is advantageously designed as a so-called "Alu Cold Fill", meaning that a cooled solid, for example a thermoblock made of aluminum, envelops the tank feed line or comprises sections of the latter, wherein the thermoblock is cooled via a cooling circuit.

BRIEF DESCRIPTION OF THE DRAWINGS

Additional details and advantages of the invention are to be explained by the following description of figures for an exemplary embodiment based on the FIGURE. The latter shows a schematic view of a fueling facility for implementing the method according to the invention.

DETAILED DESCRIPTION OF THE INVENTION

The FIGURE shows a fueling facility 1 for hydrogen-operated vehicles used to fill gaseous hydrogen into a storage tank 1 that can be hooked up to the fueling facility 1 by means of a storage tank valve 16. The fueling facility 1 exhibits a tank feed line 3, which draws the hydrogen from a supply tank system 2 and relays it to the storage tank 1. Provided at the entry to the tank feed line 3 is a valve 9 with a ramp regulator, which can be used to traverse a pressure ramp, followed by a cooling device 7. The cooling device 7 preferably exhibits a thermoblock made out of aluminum (also referred to as "Alu Cold Fill"), which envelops or comprises sections of the tank feed line 3, and cools the hydrogen flowing through the tank feed line 3 to a predefined temperature. The cooling device 7 exhibits a cooling circuit for cooling the thermoblock. Provided downstream from the cooling device 7 is a preferably pneumatic fueling valve 4, which can be an inlet valve of a gas pump of the fueling facility 1, as well as an ensuing hand valve 10 for interrupting the tank feed line 3.

A line 5 (also referred to as return line) designed to remove hydrogen from the tank feed line branches away from the tank feed line 3 between the cooling device 7 and fueling valve 4, preferably immediately upstream from the fueling valve 4. Aforesaid line 5 here connects the tank feed line 3 with the supply tank system 2 and preferably serves to return hydrogen used for cooling the tank feed line 3 into the supply tank system 2. Provided upstream from the branch of the line 5 is a temperature transmitter 8 for acquiring the temperature of the tank feed line 3 or the hydrogen flowing through the tank feed line 3.

Further situated downstream from the hand valve 10 is a flowmeter 11, which detects the mass flow of the hydrogen flowing through the tank feed line 3. A chimney line 13 further branches away from the tank feed line 3 downstream from the flowmeter 11, so that hydrogen can be controllably released into the environment through a vent valve 12 arranged on the chimney line 13. Also provided downstream from the flowmeter 11 is a breakaway coupling 15, which joins the tank feed line 3 with the storage tank or vehicle tank 20 to be filled by way of a fueling hose 14, a fueling nozzle at a free end of the fueling hose 14 and the storage tank valve 16 (e.g., check valve). The breakaway coupling 15 makes it possible to controllably detach the fueling hose 14 from the tank feed line 13 under tension, for example when a vehicle drives away with the fueling hose 14 engaged.

In the method according to the invention, the actual fueling process is preceded by guiding a flow of hydrogen through the tank feed line 3 with the fueling valve 4 closed and returning it to the storage tank system 2 via the line 5 in order to cool the tank feed line 3. The temperature of the hydrogen or temperature of the tank feed line 3 is here measured with the temperature transmitter 8 or some other temperature measuring equipment 8 upstream from the branch of the line 5. If a desired target temperature for the tank feed line 3 is present, the process of filling up the storage tank 20 is begun. To this end, the valve 6 is closed, and the hydrogen is pressed into the storage tank 20 with the fueling valve 4 open by means of a pressure ramp, which is operated with the help of the ramp valve 9. A pressure and tightness check is preferably also performed before filling up the storage tank 20.

REFERENCE LIST

| | |
|---|---|
| 1 | Fueling facility |
| 2 | Supply tank system |
| 3 | Tank feed line |
| 4 | Fueling valve |
| 5 | Return line |
| 6 | Valve |
| 7 | Cooling device (e.g., "Alu Cold Fill") |
| 8 | Temperature transmitter |
| 9 | Ramp valve |
| 10 | Hand valve |
| 11 | Mass flowmeter |
| 12 | Safety valve (vent) |
| 13 | Chimney line |
| 14 | Fueling hose with tank nozzle |
| 15 | Breakaway coupling |
| 16 | Fueling nozzle |
| 17 | Storage tank valve |
| 20 | Storage tank |

What we claim is:

1. A method for filling up a storage tank with a gaseous, pressurized medium in which a supply tank system for storing the hydrogen is connected with the storage tank to be filled by way of a tank feed line , wherein, prior to filling up the storage tank with aforesaid medium, a flow of the medium for cooling the tank feed line is guided through the tank feed line, and removed from the tank feed line through a line that branches away from the tank feed line (upstream from the storage tank.

2. The method according to claim 1, characterized in that the tank feed line exhibits a fueling valve for blocking the tank feed line, which is designed in particular as the inlet valve of a gas pump, wherein aforesaid line branches way from the tank feed line upstream from the fueling valve, and wherein the aforesaid flow is guided through the tank feed line and removed from the tank feed line via the aforesaid line with the fueling valve closed.

3. The method according to claim 1, characterized in that the medium used to cool the tank feed line is returned into the supply tank system via aforesaid line.

4. The method according to claim 1 characterized in that the actual temperature of the tank feed line is measured while cooling the tank feed line upstream from the branch of aforesaid line.

5. The method according to claim 4, characterized in that the storage tank is filled with the medium when the actual temperature is less than or equal to a predefined target temperature.

6. The method according to claim 2, characterized in that, in order to fill up the storage tank, the fueling valve is opened, and the aforesaid line is blocked by means of a valve.

7. A fueling facility for filling up a storage tank with a gaseous, pressurized medium comprising:
 a supply tank system for storing the medium, and
 a tank feed line set up and provided to connect the supply tank system with the storage tank,
characterized in that
the fueling facility is designed to guide a flow of medium for cooling the tank feed line through the tank feed line prior to filling up the storage tank, and remove it from the tank feed line by way of a line of the fueling facility that branches away from the tank feed line.

8. The fueling facility according to claim 7, characterized in that the tank feed line exhibits a fueling valve, which in particular is designed as an inlet valve of a gas pump, wherein aforesaid line branches away from the tank feed line upstream from the fueling valve.

9. The fueling facility according to claim 7, characterized in that the line is designed to return the flow of medium used to cool the tank feed line into the supply tank system.

10. The fueling facility according to claim 7, characterized in that the line exhibits a valve for blocking the line for filling the storage tank with the medium.

11. The fueling facility according to claim 7, characterized in that a cooling device designed to cool the medium is provided on the tank feed line between the supply tank system and the branch of aforesaid line.

12. The method according to claim 1, characterized in that the storage tank is a vehicle tank.

13. The method according to claim 1, characterized in that the gaseous, pressurized medium is hydrogen.

14. The fueling facility according to claim 7, characterized in that the storage tank is a vehicle tank.

15. The fueling facility according to claim 7, characterized in that the gaseous, pressurized medium is hydrogen.

\* \* \* \* \*